(12) United States Patent
Ward

(10) Patent No.: US 12,551,487 B2
(45) Date of Patent: Feb. 17, 2026

(54) PI3K INHIBITOR FOR USE IN THE THERAPY OF B CELL LYMPHOMA

(71) Applicant: Convalife (Shanghai) Co. Limited, Shanghai (CN)

(72) Inventor: Penelope Ward, Oxfordshire (GB)

(73) Assignee: Convalife (Shanghai) Co. Limited, Shanghai (CN)

( * ) Notice: Subject to any disclaimer, the term of this patent is extended or adjusted under 35 U.S.C. 154(b) by 1012 days.

(21) Appl. No.: 17/612,709

(22) PCT Filed: Jul. 1, 2020

(86) PCT No.: PCT/GB2020/051582
§ 371 (c)(1),
(2) Date: Nov. 19, 2021

(87) PCT Pub. No.: WO2021/001650
PCT Pub. Date: Jan. 7, 2021

(65) Prior Publication Data
US 2022/0273667 A1    Sep. 1, 2022

(30) Foreign Application Priority Data
Jul. 1, 2019   (GB) ..................... 1909468

(51) Int. Cl.
A61K 31/5386   (2006.01)
A61K 45/06     (2006.01)
A61P 35/00     (2006.01)
C07D 519/00    (2006.01)

(52) U.S. Cl.
CPC .......... *A61K 31/5386* (2013.01); *A61K 45/06* (2013.01); *A61P 35/00* (2018.01); *C07D 519/00* (2013.01)

(58) Field of Classification Search
CPC ............................ A61K 31/5386; A61P 35/00
See application file for complete search history.

(56) References Cited

U.S. PATENT DOCUMENTS

| | | | |
|---|---|---|---|
| 3,491,092 A | 1/1970 | Grigat et al. |
| 4,017,500 A | 4/1977 | Mayer et al. |
| 5,703,075 A | 12/1997 | Gammill et al. |
| 7,182,958 B1 | 2/2007 | Oren et al. |
| 7,361,662 B2 | 4/2008 | Rault et al. |
| 8,242,116 B2 | 8/2012 | Alexander et al. |
| 8,338,592 B2 | 12/2012 | Alexander et al. |
| 8,710,054 B2 | 4/2014 | Alexander et al. |
| 8,921,361 B2 | 12/2014 | Cmiljanovic et al. |
| 8,981,087 B2 | 3/2015 | Shuttleworth et al. |
| 9,200,007 B2 | 12/2015 | Shuttleworth et al. |
| 9,266,879 B2 | 2/2016 | Shuttleworth et al. |
| 9,580,442 B2 | 2/2017 | Shuttleworth et al. |
| 9,663,487 B2 | 5/2017 | Shuttleworth et al. |
| 9,868,749 B2 | 1/2018 | Alexander et al. |
| 9,890,174 B2 | 2/2018 | Alexander et al. |
| 9,932,343 B2 | 4/2018 | Alexander et al. |
| 9,938,290 B2 | 4/2018 | Shuttleworth et al. |
| 9,981,987 B2 | 5/2018 | Shuttleworth et al. |
| 10,035,785 B2 | 7/2018 | Shuttleworth et al. |
| 10,087,179 B2 | 10/2018 | Alexander et al. |
| 10,377,764 B2 | 8/2019 | Shuttleworth et al. |
| 10,442,815 B2 | 10/2019 | Shuttleworth et al. |
| 10,501,478 B2 | 12/2019 | Shuttleworth et al. |
| 10,513,530 B2 | 12/2019 | Shuttleworth et al. |
| 10,668,077 B2 | 6/2020 | Shuttleworth et al. |
| 11,291,669 B2 | 4/2022 | Shuttleworth et al. |
| 11,708,378 B2 | 7/2023 | Shuttleworth et al. |
| 11,779,586 B2 | 10/2023 | Shuttleworth et al. |
| 2002/0151544 A1 | 10/2002 | Hayakawa et al. |
| 2007/0135466 A1 | 6/2007 | Ledeboer et al. |
| 2011/0201608 A1 | 8/2011 | Hoffmann et al. |

(Continued)

FOREIGN PATENT DOCUMENTS

| | | | |
|---|---|---|---|
| EP | 1277738 A1 | 1/2003 |
| EP | 1724267 A1 | 11/2006 |
| GB | 1402431 A | 8/1975 |
| WO | WO-2001/08356 A1 | 2/2001 |
| WO | WO-01/83456 A1 | 11/2001 |
| WO | WO-02/02551 A1 | 1/2002 |
| WO | WO-02/085400 A1 | 10/2002 |
| WO | WO-2004/006846 A2 | 1/2004 |
| WO | WO-2004/043956 A1 | 5/2004 |
| WO | WO-2005/117889 A1 | 12/2005 |
| WO | WO-2006/046035 A1 | 5/2006 |
| WO | WO-2006/127587 A1 | 11/2006 |
| WO | WO-2007/084667 A2 | 7/2007 |
| WO | WO-2007/122410 A1 | 11/2007 |
| WO | WO-2007/127183 A1 | 11/2007 |

(Continued)

OTHER PUBLICATIONS

Alvarez-Rua et al., "Multiple Hydrogen Bonds and Tautomerism in Naphthyridine Derivatives", New J. Chem. 28, 700-07 (2004).

(Continued)

*Primary Examiner* — Alicia L Otton
(74) *Attorney, Agent, or Firm* — DLA Piper LLP (US)

(57) ABSTRACT

The present invention relates to a compound of formula (I), or its pharmaceutically acceptable salt. The compound, or its pharmaceutically acceptable salt, is useful as a PI3K inhibitor and therefore in therapy. In particular, the compound, or its pharmaceutically acceptable salt, has utility in the treatment of B cell lymphoma.

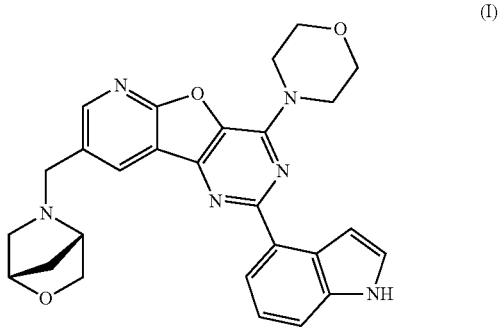

(I)

22 Claims, No Drawings

(56) References Cited

U.S. PATENT DOCUMENTS

| | | |
|---|---|---|
| 2012/0178737 A1 | 7/2012 | Shuttleworth et al. |
| 2013/0109688 A1 | 5/2013 | Shuttleworth et al. |
| 2014/0163033 A1 | 6/2014 | Bernal Anchuela et al. |
| 2015/0080395 A1 | 3/2015 | Shuttleworth et al. |
| 2016/0108057 A1 | 4/2016 | Shuttleworth et al. |
| 2016/0113932 A1 | 4/2016 | Stern et al. |
| 2016/0347771 A1 | 12/2016 | Shuttleworth et al. |
| 2018/0009826 A1 | 1/2018 | Shuttleworth et al. |
| 2018/0072699 A1 | 3/2018 | Shuttleworth et al. |
| 2018/0235974 A1 | 8/2018 | Shuttleworth et al. |
| 2018/0243313 A1 | 8/2018 | Shuttleworth et al. |
| 2018/0243317 A1 | 8/2018 | Shuttleworth et al. |
| 2018/0244685 A1 | 8/2018 | Shuttleworth et al. |
| 2018/0244686 A1 | 8/2018 | Shuttleworth et al. |
| 2019/0040079 A1 | 2/2019 | Shuttleworth et al. |
| 2019/0092790 A1 | 3/2019 | Shuttleworth et al. |
| 2020/0354378 A1 | 11/2020 | Shuttleworth et al. |
| 2021/0069200 A1 | 3/2021 | Shuttleworth et al. |
| 2021/0275537 A1 | 9/2021 | Shuttleworth et al. |
| 2022/0041624 A1 | 2/2022 | Shuttleworth et al. |

FOREIGN PATENT DOCUMENTS

| | | |
|---|---|---|
| WO | WO-2008/064018 A1 | 5/2008 |
| WO | WO-2008/076447 A2 | 6/2008 |
| WO | WO-2008/094992 A2 | 8/2008 |
| WO | WO-2008/121257 A1 | 10/2008 |
| WO | WO-2008/145688 A2 | 12/2008 |
| WO | WO-2008/150827 A1 | 12/2008 |
| WO | WO-2010/015520 A1 | 2/2010 |
| WO | WO-2010/037765 A2 | 4/2010 |
| WO | WO-2010/052569 A2 | 5/2010 |
| WO | WO-2011/012883 A1 | 2/2011 |
| WO | WO-2011/021038 A1 | 2/2011 |
| WO | WO-2011/079231 A1 | 6/2011 |
| WO | WO-2011/135351 A1 | 11/2011 |
| WO | WO-2013/014448 A1 | 1/2013 |
| WO | WO-2013/017480 A1 | 2/2013 |
| WO | WO-2013/132270 A1 | 9/2013 |
| WO | WO-2014/081718 A1 | 5/2014 |
| WO | WO-2015/054099 A1 | 10/2014 |
| WO | WO-2014/181137 A1 | 11/2014 |
| WO | WO-2014/210354 A1 | 12/2014 |
| WO | WO-2015/054355 A1 | 4/2015 |
| WO | WO-2015/121657 A1 | 8/2015 |
| WO | WO-2016/075130 A1 | 5/2016 |
| WO | WO-2017/029514 A1 | 2/2017 |
| WO | WO-2017/029517 A1 | 2/2017 |
| WO | WO-2017/029518 A1 | 2/2017 |
| WO | WO-2017/029519 A1 | 2/2017 |
| WO | WO-2017/029521 A1 | 2/2017 |
| WO | WO-2021/001650 A1 | 1/2021 |

OTHER PUBLICATIONS

Ameriks et al., "Small Molecule Inhibitors of Phosphoinositide 3-Kinase (PI3K) δ and γ", Current Topics in Medicinal Chemistry, 2009, vol. 9, No. 8, pp. 738-753.
Annex to Form PCT/ISA/206 Communication relating to the results of the partial international search for International Application No. PCT/GB2016/052571 mailed Nov. 9, 2016 (4 pages).
Baldev Singh et al., "Novel cAMP PDE III Inhibitors: 1,6-Naphthyridin-2(18)-ones", Journal of Medicinal Chemistry, American Chemical Society, 35(26): 5858-4865, Jan. 1, 1992, New York.
Brachmann, S. et al. PI3K and mTOR inhibitors—a new generation of targeted anticancer agents. Current Opinion in Cell Biology. 2009, 21, 194-198.
Bianchi et al. (2014) "Team Work Matters: Dual Inhibition Puts Non-Hodgkin Lymphoma Under Siege," Clin Cancer Res 20(23):5863-5865.
Bodo et al. (2012) "Abstract 3714; The PI3K Inhibitor GS-1101 (CAL-101) Synergistically Potentiates HDAC-Induced Proliferation Inhibition and Apoptosis Through the Activation of JNK in Lymphoma Cells," Blood 120(21):3714.
CAS Registry Nos. 1214438-02-4 and 1214393-37-9 (Mar. 25, 2010).
Cohen et al., Current Opinion in Chemical Biology, 3, 459-465, 1999.
D.A. Kovalskiy et al., "Synthesis of 7-(3-piperidyl)[1,6]naphthyridine and 7-(4-piperidyl)[1,6]naphthyridine", Chemistry of Heterocyclic Compounds, 45(9): 1053-1057, Nov. 24, 2009.
Database Chemcats [Online], Chemical Abstracts Service, Apr. 22, 2011, Columbus, Ohio.
Erik L. Meredith et al., "Identification of Orally Available Naphthyridine Protein Kinase D Inhibitors", Journal of Medicinal Chemistry, 53(15): 5400-5421, Aug. 12, 2010.
European Search Report for EP application No. 18202398.6 dated Feb. 15, 2019 (5 pages).
Fabbro et al. Pharmacology & therapeutics 93, 79-98, 2002.
Golub et al., Science, 286, 531-537, 1999.
Hayakawa, et al., "Synthesis and Biological Evaluation of Pyrido[3',2':4,5]furo[3,2-d]pyrimidine Derivatives as Novel PI3 Kinase p110α Inhibitors" Bioorganic & Medicinal Chemistry Letters, 2007, vol. 17, pp. 2438-2442.
Hollebecque A et al., (2014), 'A Phase Ib Trial of LY2584702 Tosylate, a p70 S6 Inhibitor, in Combination with Erlotinib or Everolimus in Patients with Solid Tumours,' Eur J Cancer, 50(5):876-84.
International Preliminary Report on Patentability and Written Opinion of the International Searching Authority for PCT/GB2010/051221 dated Jan. 31, 2012 (7 pages).
International Preliminary Report on Patentability and Written Opinion of the International Searching Authority for PCT/GB2010/051370 dated Feb. 21, 2012 (6 pages).
International Preliminary Report on Patentability and Written Opinion of the International Searching Authority for PCT/GB2011/050824 dated Nov. 6, 2012 (7 pages).
International Preliminary Report on Patentability and Written Opinion of the International Searching Authority for PCT/GB2013/050583 dated Sep. 9, 2014 (6 pages).
International Preliminary Report on Patentability and Written Opinion of the International Searching Authority for PCT/GB2015/050396 dated Aug. 16, 2016 (6 pages).
International Search Report and Written Opinion of the International Searching Authority for PCT/GB2020/051582 mailed Oct. 8, 2020 (10 pages).
International Search Report of the International Searching Authority for PCT/GB2010/051221 dated Oct. 7, 2010 (4 pages).
International Search Report of the International Searching Authority for PCT/GB2010/051370 dated Nov. 9, 2010 (4 pages).
International Search Report of the International Searching Authority for PCT/GB2011/050824 dated Jul. 12, 2011 (5 pages).
International Search Report of the International Searching Authority for PCT/GB2013/050583 dated May 6, 2013 (4 pages).
International Search Report of the International Searching Authority for PCT/GB2015/050396 mailed Mar. 25, 2015 (3 pages).
International Search Report of the International Searching Authority for PCT/GB2016/052571 mailed Feb. 23, 2017 (6 pages).
Lin L. et al., (2014), 'Dual Targeting of Glioblastoma Multiforme with a Proteasome Inhibitor (Velcade) and a Phosphatidylinositol 3-Kinase Inhibitor (ZSTK474),' Int J Oncol, 44(2):557-62.
Liu, Q. et al. mTOR mediated anti-cancer drug discovery. Drug Discovery Today: Therapeutic Strategies. 2009, 6 (2), 47-55.
Mass, R. D., Int. J. Radiation Oncology Bio. Phys. vol. 58 (3): 932-940, 2004.
Notification of the Transmittal of the International Search Report and the Written Opinion of the International Searching Authority, or the Declaration, (form ISA/220), International Application No. PCT/GB2016/052575 , mailed Nov. 9, 2016 (13 pages).
Notification of the Transmittal of the International Search Report and the Written Opinion of the International Searching Authority, or the Declaration, (form ISA/220), International Application No. PCT/GB2016/052577 , mailed Nov. 9, 2016 (10 pages).
Notification of the Transmittal of the International Search Report and the Written Opinion of the International Searching Authority, or

(56) References Cited

OTHER PUBLICATIONS the Declaration, (form ISA/220), International Application No. PCT/GB2016/052578, mailed Oct. 25, 2016 (12 pages).
Notification of the Transmittal of the International Search Report and the Written Opinion of the International Searching Authority, or the Declaration, (form ISA/220), International Application No. PCT/GB2016/052581, mailed Oct. 24, 2016 (13 pages).
Saifuddin, M. et al., "Water-Accelerated Cationic pi-(7-endo) cyclisation: Application to Indole-Based Peri-Annulated Polyheterocycles." European Journal of Organic Chemistry, 2010, 26, 5108-5117.
Schröder E et al., 'Arzneimittel Chemie Passage,' *Arzneimittelchemie Grundlagen Nerven, Muskeln und Gewebe [Pharmaceutical Chemistry I: Basic, Nerves, Muscles and Tissues]*, (1st Ed, 1976), Thieme Georg Verla, Stuttgart DE (Publ) pp. 30-33 and Table 8 XP002186820.
Shuttleworth, S. J. et al. Progress in the Preclinical Discovery and Clinical Development of Class I and Dual Class I/IV Phosphoinositide 3-Kinase (PI3K) Inhibitors. Current Medicinal Chemistry, 2011, 18, 2686-2714.
Somei et al., "Boronation-Thallation, A New Approach to the Synthesis of Indoles Having Aryl and/or a Heteroaryl Substituent at the 4-Position." Chem. Pharm. Bull. 1986, 34, 3971-3.
Tao J et al., (2013), 'Combined Treatment of BTK and PI3K Inhibitors Synergistically Disrupts BCR-Signaling, Overcomes Microenvironment-Mediated Survival and Drug Resistance in Mantle Cell Lymphoma,' Proceedings of the 104th Annual Meeting of the American Association for Cancer Research, Apr. 6-10, 2013, Washington, D.C. Philadelphia PA, AACR Abstract #4944, OASIS, Chicago, IL (Publ) (2 pages) [retrieved on Jul. 16, 2014 at <http://wwwabstractsonline.com/Plan/ViewAbstract.aspx?Key=605>...] (ABSTRACT).
Verheijen et al., "Phosphatidylinositol 3-kinase (PI3K) inhibitors as anticancer drugs", Drugs of the Future, 2007, vol. 32, No. 6, pp. 537-547.
Written Opinion of the International Searching Authority for PCT/GB2016/052571 dated Feb. 23, 2017 (9 pages).
Yamada T et al., (2013) 'A Novel HDAC Inhibitor OBP-801 and a PI3K Inhibitor LY294002 Synergistically Induce Apoptosis via the Suppression of Survivin and XIAP in Renal Cell Carcinoma,' Int J Oncol, 43(4):1080-6.
Zhao, X. et al. Discovery of novel Bruton's tyrosine kinase (BTK) inhibitors bearing a pyrrolo[2,3-d]pyrimidine scaffold. Bioorganic and Medicinal Chemistry, 23, 2015, 891-901.
Zhong H et al., (2013) 'Synergistic Effects of Concurrent Blockade of PI3K and MEK Pathways in Pancreatic Cancer Preclinical Models,' PLoS One, 8(10):e77243.
Zhou W et al., (2009) Novel Mutant-Selective EGFR Kinase Inhibitors Against EGFR T790M, Nature, 462(7276):1070-4 [NIH Public Access Version].

PI3K INHIBITOR FOR USE IN THE THERAPY OF B CELL LYMPHOMA

CROSS-REFERENCE TO RELATED APPLICATIONS

This application is the national stage application of International Patent Application No. PCT/GB2020/051582, filed Jul. 1, 2020, which claims the benefit of and priority to Great Britain Patent Application No. 1909468.9, filed Jul. 1, 2019, the contents of each of which are hereby incorporated by reference in their entirety.

FIELD OF THE INVENTION

The invention relates to the use of 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene or a pharmaceutically acceptable salt thereof to treat or prevent B cell lymphoma. This compound has the chemical structure:

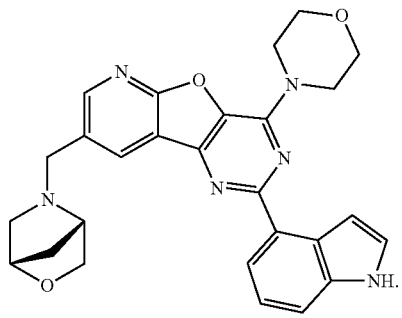 [SMILES: c1cc(-c2nc(N3CCOCC3)c3oc4ncc(CN5C[C@@H]6C[C@H]5CO6)cc4c3n2)c2cc[nH]c2c1]

BACKGROUND OF THE INVENTION

The phosphoinositide 3-kinases (PI3Ks) constitute a family of lipid kinases involved in the regulation of a network of signal transduction pathways that control a range of cellular processes. PI3Ks are classified into three distinct subfamilies, named class I, II, and III based upon their substrate specificities. Class IA PI3Ks possess a p110α, p110β, or p110δ catalytic subunit complexed with one of three regulatory subunits, p85a, p8513 or p556. Class IA PI3Ks are activated by receptor tyrosine kinases, antigen receptors, G-protein coupled receptors (GPCRs), and cytokine receptors. The class IA PI3Ks primarily generate phosphatidylinositol-3,4,5-triphosphate (PI(3,4,5)P$_3$), a second messenger that activates the downstream target AKT. The consequences of biological activation of AKT include tumour cell progression, proliferation, survival and growth, and there is significant evidence suggesting that the PI3K/AKT pathway is dysregulated in many human cancers. Additionally, PI3K activity has been implicated in endocrinology, cardiovascular disease, immune disorders and inflammation. It has been established that PI3K-p110δ plays a critical role in the recruitment and activation of immune and inflammatory cells. PI3K-p1104δ is also upregulated in a number of human tumours and plays a key role in tumour cell proliferation and survival. Compounds which are able to modulate p110δ activity have important therapeutic applications in cancer.

Despite therapeutic advances, the currently available treatments for several haematological cancers, in particular B cell lymphoma, remain unsatisfactory. Although a high proportion of patients show response to initial lines of therapy, many fail to achieve disease remission, and some experience disease relapse. As a consequence, there is considerable need for the design and development of novel medicines for the alleviation of these disorders, in particular agents that regulate molecular targets associated with haematological cancer development and progression.

The compound of the present invention has been characterised and described in international patent application published as WO2015/121657.

SUMMARY OF THE INVENTION

References to the compound (4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene) or may include references to the pharmaceutically acceptable salt.

Where a chemical structure is shown, the accuracy of the structure takes preference over the compound name.

The present invention is based on a compound or a pharmaceutically acceptable salt thereof for use in the treatment of B cell lymphoma wherein the compound has the structure:

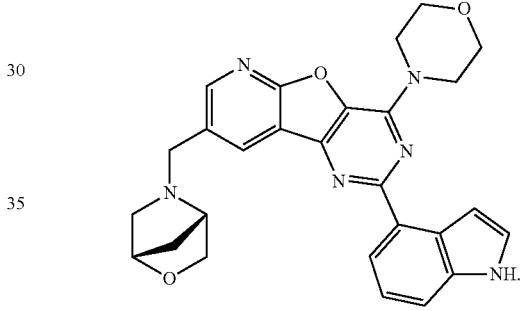

B cell lymphoma may be one or more of diffuse large B-cell lymphoma, follicular non-Hodgkin lymphoma, chronic lymphocytic leukaemia, small lymphocytic lymphoma, mantle cell lymphoma, marginal zone lymphoma, Burkitt lymphoma, lymphoplasmacytic lymphoma, hairy cell leukaemia, primary central nervous system lymphoma, primary intraocular lymphoma or Waldenstrom macroglobulinemia. In one embodiment, the compound is for use in the treatment of diffuse large B-cell lymphoma, follicular lymphoma, mantle cell lymphoma, chronic lymphocytic leukaemia, small lymphocytic lymphoma or Waldenstrom macroglobulinemia.

As used herein, a pharmaceutically acceptable salt is a salt with a pharmaceutically acceptable acid or base. Pharmaceutically acceptable acids include both inorganic acids such as hydrochloric, sulfuric, phosphoric, diphosphoric, hydrobromic or nitric acid and organic acids such as citric, fumaric, maleic, malic, ascorbic, succinic, tartaric, benzoic, acetic, methanesulfonic, ethanesulfonic, ethanedisulfonic, salicylic, stearic, benzenesulfonic or p-toluenesulfonic acid. The compound is preferably provided as its succinate salt.

The compound for use is preferably administered once or twice daily.

Preferably, the 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene or a pharmaceutically acceptable salt is administered orally, preferably with water, and is preferably administered after the patient has consumed food. In a favourable embodiment, the 4-(1H-Indol-4-0)-6-(morpholin-4-yl)-12-[(1S,4S)-2-oxa-5-azabicyclo[2.2.1.]heptan-5-ylmethyl]-8-oxa-3,5,10-triazatricyclo[7.4.0.02,7]trideca-1 (13),2(7),3,5,9,11-hexaene or a pharmaceutically acceptable salt is administered with approximately 240 mL of water and within one hour after the patient has consumed food. For this purpose, 4-(1H-Indol-4-yl)-6-(morpholin-4-yl)-12-[(1S, 4S)-2-oxa-5-azabicyclo[2.2.1]heptan-5-ylmethyl]-8-oxa-3, 5,10-triazatricyclo[7.4.0.02,7]trideca-1(13),2(7),3,5,9,11-hexaene or a pharmaceutically acceptable salt may be administered in capsule form.

For oral administration, the compound can be administered as tablets, troches, lozenges, aqueous or oily suspensions, dispersible powders or granules. Preferred pharmaceutical compositions of the invention are tablets and capsules.

A compound of the invention may also be formulated with an agent which reduces degradation of the substance by processes other than the normal metabolism of the patient, such as anti-bacterial agents, or inhibitors of protease enzymes which might be the present in the patient or in commensural or parasite organisms living on or within the patient, and which are capable of degrading the compound.

Liquid dispersions for oral administration may be syrups, emulsions and suspensions.

Suspensions and emulsions may contain as carrier, for example a natural gum, agar, sodium alginate, pectin, methylcellulose, carboxymethylcellulose, or polyvinyl alcohol.

The compound for use is preferably administered in a dose of at least 50 mg daily, more preferably 100 mg daily, and still more preferably 150 mg daily, and most preferably 200 mg daily.

The compound for use may be administered in a dose of up to 600 mg daily, more preferably up to 500 mg daily, still more preferably up to 400 mg daily, still more preferably up to 300 mg daily, and most preferably up to 200 mg daily.

The compound for use may be administered in a dose of between 50 and 400 mg daily, preferably between 200 and 400 mg daily, more preferably 200 mg daily.

The compound for use may be administered in capsule form.

The compound for use is advantageously administered to a patient having already received conventional first-line treatment, e.g. treatment with a regimen comprising one or more of conventional cytotoxic agents such as cyclophosphamide, doxorubicin, vincristine, prednisone or chlorambucil, a CD20 antibody with or without a drug conjugate such as rituximab, obinutuzumab or ibritumomab, a BCL2 inhibitor such as venetoclax, a BTK inhibitor such as ibrutinib, an immunomodulatory imide drug such as lenalidomide, a proteasome inhibitor such as bortezomib, radiation therapy, agents that modulate anti-tumour immunity including agents modulating immune checkpoints (e.g. PD(L)1 targeting agents such as pembrolizumab or nivolumab, CTLA-4 targeting agents such as ipilimumab, agents targeting OX40, LAG3, TIM3 or other immunomodulatory molecules), bi-specific T-cell engaging therapies, or cellular therapies (e.g. adoptive T-cell therapy, CAR-T therapy). The compound for use may advantageously be administered to patients who have already received a BTK inhibitor such as ibrutinib ibrutinib and/or a BCL2 inhibitor such as venetoclax therapy.

In one embodiment, treatment comprises administering an effective amount of 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3, 5,9,11-hexaene or a pharmaceutically acceptable salt thereof, in a 28 to 35 day cycle, wherein 4-(1H-Indol-4-yl)-6-(morpholin-4-yl)-12-[(1S,4S)-2-oxa-5-azabicyclo[2.2.1] heptan-5-ylmethyl]-8-oxa-3,5,10-triazatricyclo[7.4.0.02,7] trideca-1(13),2(7),3,5,9,11-hexaene is administered daily or twice a day to the patient for 3 or 4 weeks, and 1 week no 4-(1H-Indol-4-0)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene is administered.

The invention also provides a pharmaceutical composition for use in the treatment of B cell lymphoma comprising an embodiment of 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3, 5,9,11-hexaene as previously defined and a pharmaceutically acceptable excipient.

Preferably, the compound is at least 60% enantiomerically pure, more preferably 70%, still more preferably 80%, still more preferably 90%, still more preferably 95%, still more preferably 99%.

The pharmaceutically excipient may comprise one or more of lactose monohydrate, microcrystalline cellulose, crospovidone, hydroxypropyl cellulose, magnesium stearate and sodium lauryl sulfate. In one embodiment, the pharmaceutical formulation consists of lactose monohydrate, microcrystalline cellulose, crospovidone, hydroxypropyl cellulose, magnesium stearate and sodium lauryl sulfate and 4-(1H-Indol-4-0)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene as its succinate salt.

In one embodiment the pharmaceutical composition is for use in the treatment of one or more of diffuse large B-cell lymphoma, follicular non-Hodgkin lymphoma, chronic lymphocytic leukaemia, small lymphocytic lymphoma, mantle cell lymphoma, marginal zone lymphoma, Burkitt lymphoma, lymphoplasmacytic lymphoma, hairy cell leukaemia, primary central nervous system lymphoma, primary intraocular lymphoma or Waldenstrom macroglobulinemia. Advantageously, the pharmaceutical composition is for use in the treatment of B-cell lymphoma, follicular lymphoma, mantle cell lymphoma, chronic lymphocytic leukaemia, small lymphocytic lymphoma or Waldenstrom macroglobulinemia.

The pharmaceutical composition may comprise at least one second agent selected from the group consisting of conventional cytotoxic agents such as cyclophosphamide, doxorubicin, vincristine, prednisone or chlorambucil, a CD20 antibody with or without a drug conjugate such as rituximab, obinutuzumab or ibritumomab, a BCL2 inhibitor such as venetoclax, a BTK inhibitor such as ibrutinib, a MEK inhibitor such as trametinib, an immunomodulatory imide drug such as lenalidomide, a proteasome inhibitor such as bortezomib, radiation therapy, agents that modulate anti-tumour immunity including agents modulating immune checkpoints (e.g. PD(L)1 targeting agents such as pembrolizumab or nivolumab, CTLA-4 targeting agents such as ipilimumab, agents targeting OX40, LAGS, TIM3 or other immunomodulatory molecules), bi-specific T-cell engaging therapies, or cellular therapies (e.g. adoptive T-cell therapy, CAR-T therapy) as a combined preparation for simultaneous, sequential or separate use in therapy. Preferably, the second agent is selected from a p70S6K inhibitor, a BTK and TEC family inhibitor and a MEK1 inhibitor.

The invention also provides a kit comprising at least 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene or a pharmaceutically acceptable salt thereof, preferably the succinate salt, and at least one agent selected from the group consisting of conventional cytotoxic agents such as cyclophosphamide, doxorubicin, vincristine, prednisone or chlorambucil, a CD20 antibody with or without a drug conjugate such as rituximab, obinutuzumab or ibritumomab, a BCL2 inhibitor such as venetoclax, a BTK inhibitor such as ibrutinib, a MEK inhibitor such as trametinib, an immunomodulatory imide drug such as lenalidomide, a proteasome inhibitor such as bortezomib, radiation therapy, agents that modulate anti-tumour immunity including agents modulating immune checkpoints (e.g. PD(L)1 targeting agents such as pembrolizumab or nivolumab, CTLA-4 targeting agents such as ipilimumab, agents targeting OX40, LAG3, TIM3 or other immunomodulatory molecules), bi-specific T-cell engaging therapies, or cellular therapies (e.g. adoptive T-cell therapy, CAR-T therapy) as a combined preparation for simultaneous, sequential or separate use in therapy.

The invention also provides a method of treating or preventing B cell lymphoma in a patient comprising administering to the patient a therapeutically effective amount of at least one compound as previously defined, the pharmaceutical composition as previously defined or using the kit as previously defined.

The method may be for treating or preventing diffuse large B-cell lymphoma, follicular non-Hodgkin lymphoma, chronic lymphocytic leukaemia, small lymphocytic lymphoma, mantle cell lymphoma, marginal zone lymphoma, Burkitt lymphoma, lymphoplasmacytic lymphoma, hairy cell leukaemia, primary central nervous system lymphoma, primary intraocular lymphoma or Waldenstrom macroglobulinemia. Advantageously, the method is for treating or preventing B-cell lymphoma, follicular lymphoma, mantle cell lymphoma, chronic lymphocytic leukaemia, small lymphocytic lymphoma or Waldenstrom macroglobulinemia.

The method may provide that the compound is administered in a dose of at least 50 mg daily, more preferably 100 mg daily, and still more preferably 150 mg daily, and most preferably 200 mg daily.

The method may provide that the compound is administered in a dose of up to 600 mg daily, more preferably up to 500 mg daily, still more preferably up to 400 mg daily, still more preferably up to 300 mg daily, and most preferably up to 200 mg daily.

The method may provide that the compound is administered in a dose of between 50 and 400 mg daily, preferably between 200 and 400 mg daily, more preferably 200 mg daily.

The compound for use may be administered once daily, twice daily, three times daily or four times daily. Preferably, the compound is administered once or twice daily, and more preferably, the compound is administered once daily.

The method may provide that the compound is administered to a patient who has already received conventional first-line treatment, e.g. treatment with a regimen comprising one or more of conventional cytotoxic agents such as cyclophosphamide, doxorubicin, vincristine, prednisone or chlorambucil, a CD20 antibody with or without a drug conjugate such as rituximab, obinutuzumab or ibritumomab, a BCL2 inhibitor such as venetoclax, a BTK inhibitor such as ibrutinib, an immunomodulatory imide drug such as lenalidomide, a proteasome inhibitor such as bortezomib, radiation therapy, agents that modulate anti-tumour immunity including agents modulating immune checkpoints (e.g. PD(L)1 targeting agents such as pembrolizumab or nivolumab, CTLA-4 targeting agents such as ipilimumab, agents targeting OX40, LAG3, TIM3 or other immunomodulatory molecules), bi-specific T-cell engaging therapies, or cellular therapies (e.g. adoptive T-cell therapy, CAR-T therapy). The compound for use may advantageously be administered to patients who have already received a BTK inhibitor such as ibrutinib ibrutinib and/or a BCL2 inhibitor such as venetoclax therapy.

The invention also provides a method of treating B cell lymphoma is a patient in need thereof, comprising: administering an effective amount of 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene or a pharmaceutically acceptable salt thereof, e.g. the succinate salt.

The invention also provides a method for treating advanced or metastatic B cell lymphoma in a patient in need thereof, comprising: administering an effective amount of 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene or a pharmaceutically acceptable salt thereof, wherein the patient has progression of the B cell lymphoma after previous administration of another therapy.

The method may provide that the previous administration of another therapy is a therapy for advanced or metastatic B cell lymphoma.

Optionally in the method the previous administration of another therapy is an administration of another chemotherapeutic agent, e.g. treatment with a regimen comprising one or more of conventional cytotoxic agents such as cyclophosphamide, doxorubicin, vincristine, prednisone or chlorambucil, a CD20 antibody with or without a drug conjugate such as rituximab, obinutuzumab or ibritumomab, a BCL2 inhibitor such as venetoclax, a BTK inhibitor such as ibrutinib, an immunomodulatory imide drug such as lenalidomide, a proteasome inhibitor such as bortezomib, radiation therapy, agents that modulate anti-tumour immunity including agents modulating immune checkpoints (e.g. PD(L)1 targeting agents such as pembrolizumab or nivolumab, CTLA-4 targeting agents such as ipilimumab, agents targeting OX40, LAG3, TIM3 or other immunomodulatory molecules), bi-specific T-cell engaging therapies, or cellular therapies (e.g. adoptive T-cell therapy, CAR-T therapy). The compound for use may advantageously be administered to patients who have already received a BTK inhibitor such as ibrutinib ibrutinib and/or a BCL2 inhibitor such as venetoclax therapy.

In the method, administering an effective amount of 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene or a pharmaceutically acceptable salt thereof may comprise orally administering a total daily dose of about 200 mg to about 400 mg, preferably 200 mg, of the 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene.

In the method, administering an effective amount of 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene or a pharmaceutically acceptable salt thereof may comprise orally administering, once or twice daily, about 200 mg to about 400 mg, preferably 200 mg, of the 4-(1H-Indol-4-yl)-

6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene.

Preferably, the patient has a histological or cytological diagnosis of B cell lymphoma.

Administering an effective amount of 4-(1H-Indol-4-yl)-6-(morpholin-4-yl)-12-[(1S,4S)-2-oxa-5-aza bicyclo[2.2.1]heptan-5-ylmethyl]-8-oxa-3,5,10-triazatricyclo[7.4.0.02,7]trideca-1(13),2(7),3,5,9,11-hexaene or a pharmaceutically acceptable salt thereof may comprise administration in a 28 to 35 day cycle, wherein 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene is administered daily or twice a to the patient for 3 or 4 weeks, and 1 week no 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene is administered.

The method may further comprise administering to the patient a therapeutically effective amount of at least one second agent selected from the group consisting of conventional cytotoxic agents such as cyclophosphamide, doxorubicin, vincristine, prednisone or chlorambucil, a CD20 antibody with or without a drug conjugate such as rituximab, obinutuzumab or ibritumomab, a BCL2 inhibitor such as venetoclax, a BTK inhibitor such as ibrutinib, a MEK inhibitor such as trametinib, an immunomodulatory imide drug such as lenalidomide, a proteasome inhibitor such as bortezomib, radiation therapy, agents that modulate antitumour immunity including agents modulating immune checkpoints (e.g. PD(L)1 targeting agents such as pembrolizumab or nivolumab, CTLA-4 targeting agents such as ipilimumab, agents targeting OX40, LAGS, TIM3 or other immunomodulatory molecules), bi-specific T-cell engaging therapies, or cellular therapies (e.g. adoptive T-cell therapy, CAR-T therapy).

Administration of the compound and the at least one second agent may be separate, sequential or simultaneous.

The invention also provides a compound or a pharmaceutically acceptable salt thereof for use in the treatment of B cell lymphoma, wherein the compound has the formula:

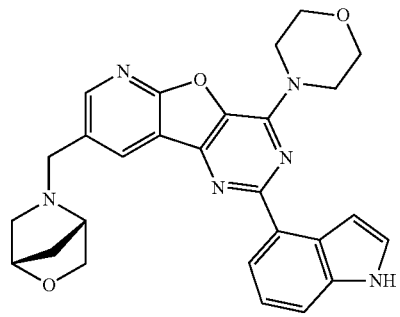 [SMILES: c1cc(-c2nc(N3CCOCC3)c3oc4ncc(CN5C[C@@H]6C[C@H]5CO6)cc4c3n2)c2cc[nH]c2c1]

and wherein the compound is administered as a total daily dose of 200 mg and wherein the compound is administered to a patient having already received treatment with one or more of cyclophosphamide, doxorubicin, vincristine, prednisone and/or rituximab therapy.

DESCRIPTION OF THE INVENTION

At the clinical cut-off date, 21 patients with relapsed or refractory B cell lymphoma had received treatment in this study; 6 patients were enrolled and treated with 50 mg daily, 3 patients with 100 mg daily, 7 patients with 200 mg daily and 5 patients with 400 mg daily.

The first patient enrolled started treatment with 50 mg 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene. Progress of each patient in each cohort up to the clinical cut-off date is summarized in Table 1 and Table 2.

TABLE 1

| Cohort/Dose | Pt No. | Lymphoma Type | Age/Gender | Dates of First/Last Treatment | Duration of Treatment (weeks) | Drug Holiday (days) | Reason for Withdrawal |
|---|---|---|---|---|---|---|---|
| 1<br>50 mg daily | 01001 | DLBCL | 68/male | 16 Aug. 2016 -<br>27 Aug. 2016 | 2 | | Disease progression |
| | 01002 | SLL | 48/male | 7 Sep. 2016 -<br>27 Dec. 2016 | 16 | 16 days<br>(CK elevation) | Disease Progression |
| | 01003 | SLL | 82/male | 14 Sep. 2016-<br>29 Nov. 2016 | 11 | | SAE: Pneumonia<br>leading to death |
| | 01004 | FL | 55/female | 28 Sep. 2016 -<br>26 Sep. 2018 | 104 | 14 days<br>(neutropenia) | SAE: CMV colitis |
| | 01005 | DLBCL | 71/male | 25 Oct. 2016 -<br>20 Nov. 2016 | 4 | | Disease progression |
| | 01006 | FL | 67/male | 26 Oct. 2016 -<br>19 Apr. 2017 | 25 | | Disease progression |
| 2<br>100 mg daily | 01007 | FL | 69/female | 8 Dec. 2016 -<br>28 Feb. 2017 | 12 | | Drug induced liver toxicity |
| | 01008 | MCL | 69/female | 28 Dec. 2016-<br>16 Mar. 2017 | 11 | | Disease progression |
| | 01009 | Waldenstrom macro-globulinemia | 58/male | 8 Feb. 2017<br>7 Dec. 2018 | 95 | | SAE: pneumonia |

TABLE 2

| Cohort/Dose | Pt No. | Lymphoma Type | Age/Gender | Dates of First/Last Treatment | Duration of Treatment (weeks) | Drug Holiday (days) | Reason for Withdrawal |
|---|---|---|---|---|---|---|---|
| 3 200 mg daily | 01010 | FL | 77/female | 16 Mar. 2017 - 3 Jul. 2017 | 16 | | SAE: pneumonitis |
| | 01011 | SLL/CLL | 73/male | 29 Mar. 2017 - 25 Sep. 2017 | 26 | 20 days (chest infection) | SAE: pneumonitis |
| | 01012 | DLBCL | 78/male | 23 May 2017 - 18 Jun. 2017 | 4 | | Disease progression |
| | 01019 | FL | 53/male | 25 Oct. 2017 - 9 Jul. 2018 - | 37 | | Disease progression |
| | 01020 | MCL | 84/male | 28 Nov. 2017 - 21 Jan. 2018 | 8 | | Heart failure |
| | 01021 | DLBCL | 76/male | 2 Mar. 2018 - 13 Mar. 2018 | 2 | | Disease progression |
| | 01023 | MCL | 68/male | 23 Oct. 2018 - 2 Nov. 2018 | 1 | | SAE: constipation and urinary retention |
| 4 400 mg daily | 01013 | DLBCL | 62/female | 12 Jul. 2017 - 9 Oct. 2017 | 13 | 42 days skin rash (dose reduced to 200 mg daily\) | Patient became eligible for transplant |
| | 01015 | DLBCL (transformed FL) | 65/male | 25 Jul. 2017 - 24 Oct. 2017 | 13 | | Disease progression |
| | 01016 | DLBCL | 59/male | 11 Aug. 2017 - 29 Oct. 2017 | 11 | | Disease progression |
| | 01017 | DLBCL | 71/male | 19 Sep. 2017 - 13 Nov. 2018 | 60 | 28 days (liver enzyme elevation) dose reduced to 200 mg daily | Disease progression |
| | 01018 | DLBCL (underlying FL) | 69/male | 26 Sep. 2017 - 11 Mar. 2018 | 24 | 16 days (skin rash) dose reduced to mg daily | Complete response: scheduled for HSCT |

A summary of efficacy outcomes in the study to date is in Table 3. Complete response was noted in subjects 01004, 01013, 01018 and 01020 while partial response has been reported for subjects 01010, 01011 and 01017 and stable disease in subjects 01006, 01007, 01009 and 01019. Among subjects starting treatment at doses of 0.200 mg daily with response data reported, the ORR is 50% (6/12). Patients achieving at least a partial response included those with indolent NHL, MCL and DLBCL. Thus there is evidence that this agent is effective as monotherapy in lymphoma that has recurred following prior treatment.

TABLE 3

Treatment Response by Cohort

| Cohort | N | Not Evaluable | Disease Progression | Stable Disease | Partial Response | Complete Response |
|---|---|---|---|---|---|---|
| 1 50 mg daily | 6 | 1 | 3 | 1 | 0 | 1 (after dose escalation to 200 mg) |
| 2 100 mg daily | 3 | 0 | 1 | 2 | 0 | 0 |
| 3 200 mg daily | 7 | 1 | 2 | 1 | 2 | 1 |
| 4 400 mg daily | 5 | 0 | 2 | 0 | 1 | 2 |

An independent review of the imaging from the study was performed by ABX-CRO. This independent review was largely concordant with the assessment of the study site (MD Anderson Cancer Center; MDACC). In the independent review, a single subject was classified differently (subject 01018, classified as complete response by MDACC and partial response by ABX-CRO; Table 4).

TABLE 4

Independent Review of Treatment Response

| Subject | Best response: MDACC | Best response: ABX-CRO |
|---|---|---|
| 01001 | PROGRESSIVE DISEASE | PROGRESSIVE DISEASE |
| 01002 | PROGRESSIVE DISEASE | PROGRESSIVE DISEASE |
| 01003 | NOT EVALUABLE | NOT EVALUABLE |
| 01004 | COMPLETE RESPONSE | COMPLETE RESPONSE |
| 01005 | PROGRESSIVE DISEASE | PROGRESSIVE DISEASE |

TABLE 4-continued

Independent Review of Treatment Response

| Subject | Best response: MDACC | Best response: ABX-CRO |
|---|---|---|
| 01006 | STABLE DISEASE | STABLE DISEASE |
| 01007 | STABLE DISEASE | STABLE DISEASE |

TABLE 4-continued

Independent Review of Treatment Response

| Subject | Best response: MDACC | Best response: ABX-CRO |
|---|---|---|
| 01008 | PROGRESSIVE DISEASE | PROGRESSIVE DISEASE |
| 01009 | STABLE DISEASE | STABLE DISEASE |
| 01010 | PARTIAL RESPONSE | PARTIAL RESPONSE |
| 01011 | PARTIAL RESPONSE | PARTIAL RESPONSE |
| 01012 | PROGRESSIVE DISEASE | PROGRESSIVE DISEASE |
| 01013 | COMPLETE RESPONSE | COMPLETE RESPONSE |
| 01015 | PROGRESSIVE DISEASE | PROGRESSIVE DISEASE |
| 01016 | PROGRESSIVE DISEASE | PROGRESSIVE DISEASE |
| 01017 | PARTIAL RESPONSE | PARTIAL RESPONSE |
| 01018 | COMPLETE RESPONSE | PARTIAL RESPONSE |
| 01019 | STABLE DISEASE | STABLE DISEASE |
| 01020 | COMPLETE RESPONSE | COMPLETE RESPONSE |
| 01021 | PROGRESSIVE DISEASE | PROGRESSIVE DISEASE |
| 01023 | NOT EVALUABLE | NOT EVALUABLE |

Synthesis of the Compound of the Present Invention 0-10° C. then rt (ii) water, 75° C. (iii) NaOH max temp 40° C.; 3) $POCl_3$, N,N-dimethylaniline, 107° C.; 4) morpholine, MeOH, rt; 5) N,N-dimethylacrylamide, $PdCl_2(PPh_3)_2$, NaOAc, DMF, 110° C.; 6) $NaIO_4$, $OsO_4$, THF, water, rt; 7) indole-4-boronic acid pinacol ester, $PdCl_2(PPh_3)_2$, sodium carbonate, dioxane, water, 102° C.

i. Ethyl-3-amino-5-bromofuro[2,3-b]pyridine-2-carboxylate

To a 10 L flask under $N_2(g)$ was added 5-bromo-2-chloropyridine-3-carbonitrile (435 g, 2.0 mol, 1 eq), DMF (2790 mL) and potassium carbonate (553 g, 4.0 mol, 2 eq). This was followed by the addition of ethyl glycolate (208.2 mL, 2.2 mol, 1.1 eq). The reaction mixture was heated to 115° C. overnight. Upon completion, the reaction mixture was cooled to rt and water (13.1 L) was added, this led to the formation of a precipitate. The mixture was stirred for 20

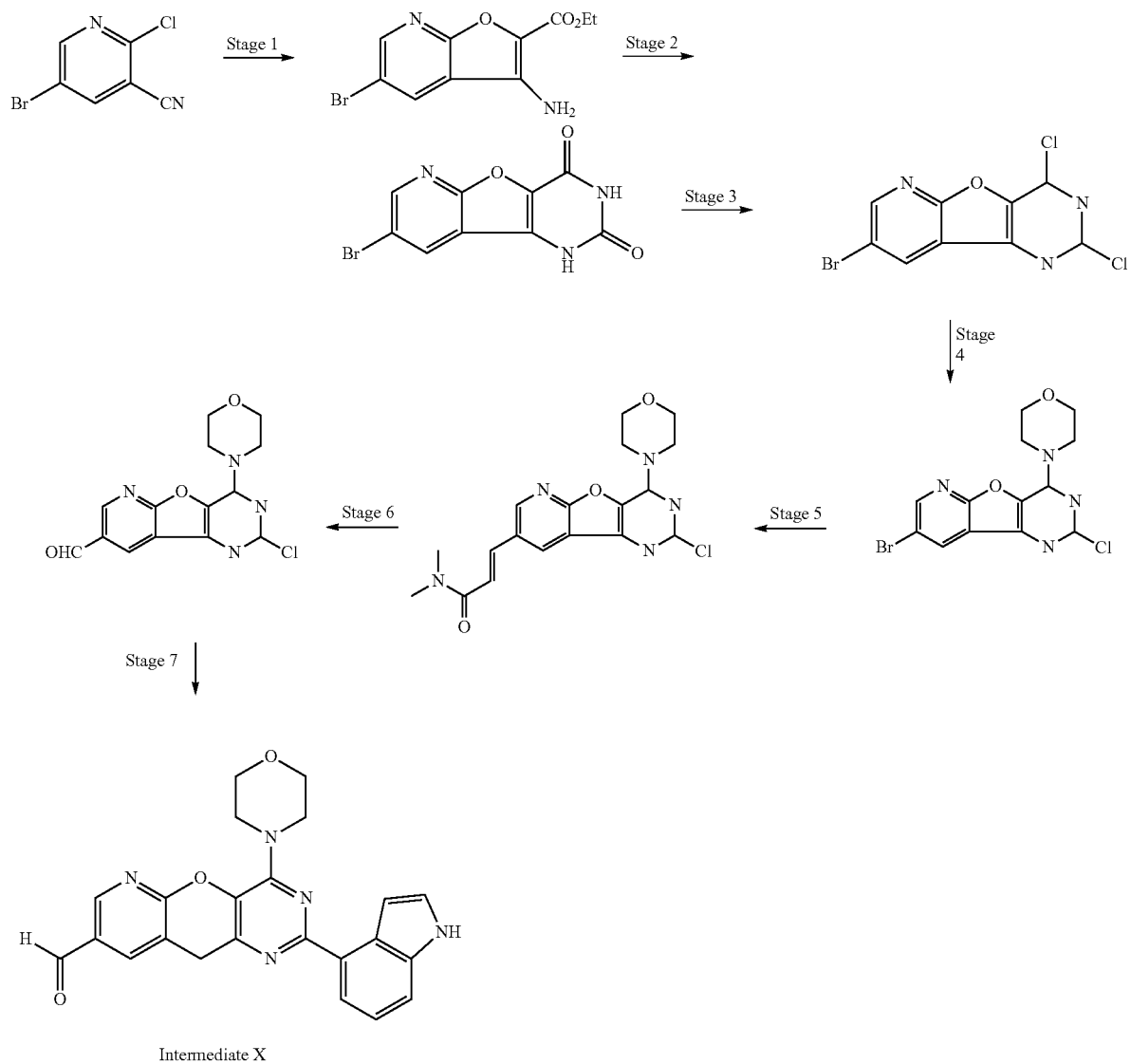

Reagents and conditions: 1) $K_2CO_3$, ethyl glycolate, DMF, 115° C.; 2) (i) chlorosulfonyl isocyanate, $CH_2Cl_2$, mins, then filtered. The resulting brown solid was dried at 50° C., slurried in $Et_2O$:heptane (9:1, 2.80 and filtered to give 405.6 g. Further purification via soxhlet extraction using TBME (4.5 L) yielded the product as a yellow solid (186 g, 34%). This procedure was repeated twice.

$^1$H NMR (400 MHz, CDCl$_3$) δH: 8.53 (d, J=2.0 Hz, 1H), 8.07 (d, J=2.0 Hz, 1H), 5.00 (br. s., 2H), 4.44 (q, J=7.0 Hz, 2H), 1.44 (t, 0.7=7.0 Hz, 3H). MS (ES$^+$) 309 (100%, [M+Na]$^+$), 307 (100%, [M+Na]$^+$).

ii. 12-Bromo-8-oxa-3,5,10-triazatricyclo[7.4.0.0$^{2,7}$] trideca-1(9),2(7),10,12-tetraene-4,6-dione To ethyl-3-amino-5-bromofuro[2,3-b]pyridine-2-carboxylate (239.0 g, 0.84 mol, 1 eq) dissolved in CH$_2$Cl$_2$ (5.5 L) was added chlorosulfonyl isocyanate (87.6 mL, 1.0 mol, 1.2 eq) dropwise at 0-10° C. The resulting reaction was stirred for 30 min, stripped to dryness and the resulting solid ground to a fine powder. Water (5.5 L) was added to the solid and the suspension was heated at 75° C. for 1 h. After cooling to rt, solid NaOH (335 g, 8.4 mol, 10 eq) was added allowing the reaction to exotherm (maximum temperature 40° C.). The reaction was cooled to 0-10° C. and the pH adjusted to 5-6 using 5M HCl (~1 L). The reaction was stirred for 30 mins, then filtered. The solid was washed with water (2.3 L) and pulled dry. Further drying in a vacuum oven at 40° C. yielded the product as a brown solid (193 g, 76%). This procedure was repeated twice.

$^1$H NMR (400 MHz, DMSO-d$_6$) δ$_H$: 12.01 (br. s., 1H), 11.58 (br. s, 1H), 8.72 (d, J=2.0 Hz, 1H), 8.59 (d, J=2.0 Hz, 1H).

MS (ES$^-$) 282 (100%, [M+H]$^+$).

iii. 12-Bromo-4,6-dichloro-8-oxa-3,5,10-triazatricyclo[7.4.0.0$^{2,7}$]trideca-1(9),2(7),3,5,10,12-hexaene To 12-bromo-8-oxa-3,5,10-triazatricyclo[7.4.0.0$^{2,7}$]trideca-1(9),2(7),10,12-tetraene-4,6-dione (387 g, 1.27 mol, 1 eq) was added POCl$_3$ (6070 mL) and N,N-dimethylaniline (348 mL, 2.8 mol, 2.2 eq). The mixture was heated at 107° C. for 10 h. Once cooled to rt, solvent was removed in vacuo azeotroping with toluene (3×3.9 L). The resulting residue was partitioned between CH$_2$Cl$_2$ (12.76 L) and water (3.9 L) and the phases separated. The organic phase was washed with water (2×3.9 L). The combined aqueous was back-extracted with CH$_2$Cl$_2$ (7.7 L) and the combined organics dried over MgSO$_4$, filtered and stripped to yield the product as brown solid (429 g, ~quant.).

$^1$H NMR (400 MHz, CDCl$_3$) δ$_H$: 8.78 (d, J=2.5 Hz, 1H), 8.72 (d, J=2.5 Hz, 1H).

iv. 12-Promo 4-chloro-6-(morpholin 4-yl)-8-oxa-3,5,10-triazatricyclo[7.4.0.0$^{2,7}$]trideca-1(9), 2 (7), 3,5,10,12-hexaene To 12-bromo-4,6-dichloro-8-oxa-3,5,10-triazatricyclo [7.4.0.0$^{2,7}$]trideca-1(9),2(7),3,5,10,12-hexaene (419.3 g, 1.32 mol, 1 eq) in MeOH (8588 mL) was added Morpholine (259 mL, 2.90 mol, 2.2 eq) at rt. After stirring for 2 h, water (0.8 L) was added. It was then cooled to 0-5° C. and stirred for an additional 30 mins. The resulting solid was filtered, washed with water (5.2 L) and pulled dry. Further purification by silica gel column chromatography with CH$_2$Cl$_2$/EtOAc (1:0-9:1) yielded the desired product (419 g, 84%).

$^1$H NMR (400 MHz, CDCl$_3$) δ$_H$: 8.66 (d, J=2.0 Hz, 1H), 8.62 (d, J=2.0 Hz, 1H), 4.07-4.21 (m, 4H), 3.85-3.91 (m, 4H).

MS (ES$^+$) 393 (100%, [M+Na]$^+$), 391 (80%, [M+Na]$^+$).

v. (2E)-3-[4-Chloro-6-(morpholin 4-yl)-8-oxa-3,5, 10-triazatricyclo[7.4.0.0$^{2,7}$]trideca-1(9), 2 (7), 3,5, 10,12-hexaen-12-yl]-N,N-dimethylprop-2-enamide To 12-bromo-4-chloro-6-(morpholin-4-0)-8-oxa-3,5,10-triazatricyclo[7.4.0.0$^2$]trideca-1(9),2(7),3,5,10,12-hexaene (60 g, 0.15 mol, 1 eq) was added N,N-dimethylacrylamide (16.7 mL, 0.15 mol, 1 eq), PdCl$_2$(PPh$_3$)$_2$ (3.4 g, 4.5 mmol, 0.03 eq) and NaOAc (40 g, 0.45 mol, 3 eq) in DMF (1.2 L). The reaction was heated at 110° C. for 7 h. This process was repeated 3 times and batches combined. Once cooled down to rt, solvent was removed in vacuo and the resulting residue was partitioned between CH$_2$Cl$_2$ (6.5 L) and water (5.5 L). The phases were separated and the aqueous phase was extracted with CH$_2$Cl$_2$ (2×4 L). The combined organics were washed with brine (2×4 L), dried over MgSO$_4$, filtered and stripped. The resulting solid was slurried in EtOAc/heptane (1:1, 0.8 L) for 30 mins, filtered, washed and washed with EtOAc/heptane (1:1, 2×450 mL). Further drying in a vacuum oven at 40° C. yielded the desired product as an orange solid (203.0 g, 86%).

$^1$H NMR (400 MHz, CDCl$_3$) δ$_H$: 8.70 (s, 2H), 7.82 (d, J=15.6 Hz, 1H), 7.07 (d, J=15.6 Hz, 1H), 4.11-4.19 (m, 4H), 3.85-3.93 (m, 4H), 3.22 (s, 3H), 3.11 (s, 3H).

MS (ES$^+$) 388 (100%, [M+H]$^+$).

vi. 4-Chloro-6-(morpholin-4-yl)-8-oxa-3,5,10 triazatricyclo[7.4.0.0$^{2,7}$]trideca-1(9),2(7), 3,5,10,12-hexaene-12-carbaldehyde (2E)-3-[4-chloro-6-(morpholin-4-yl)-8-oxa-3,5,10-triazatricyclo[7.4.0.0$^2$]trideca-1(9),2(7),3,5,10,12-hexaen-12-yl]-N,N-dimethylprop-2-enamide (124.0 g, 0.39 mol, leg) was dissolved in THF (12.4 L) at 65° C. Once cooled to 35° C., water (4.1 L), NaIO$_4$ (205.4 g, 1.17 mol, 3 eq) and OsO$_4$ (2.5 wt % in $^t$BuOH, 80.3 mL, 2%) were added. The reaction was stirred at rt for 60 h. The reaction was cooled to 0-5° C., stirred for 30 mins then filtered. The solid was washed with water (545 mL) and pulled dry. The crude product was combined with two further batches (2×118.3 g scale) and slurried in water (6.3 L) for 30 mins at rt. The solids were filtered, washed with water (1.6 L) and pulled dry. Further drying in a vacuum oven yielded the desired product as a pink solid (260 g, 88%)

$^1$H NMR (400 MHz, CDCl$_3$:MeOD, 9:1) δ$_H$: 10.13 (S, 1H), 9.04 (d, J=2.0 Hz, 1H), 8.91 (d, J=2.0 Hz, 1H), 3.99-4.13 (m, 4H), 3.73-3.84 (m, 4H).

MS (ES$^+$) 351 (100%, [M+MeOH+H]$^+$).

vii. 4-(1H-Indol-4-yl)-6-(morpholin-4-yl)-8-oxa-3,5, 10-triazatricyclo[7.4.0.0$^{2,7}$]trideca-1(9),2,4,6,10,12-hexaene-12-carbaldehyde To 4-chloro-6-(morpholin-4-yl)-8-oxa-3,5,10-triazatricyclo[7.4.0.0$^2$]trideca-1(9),2(7),3,5,10,12-hexaene-12-carbaldehyde (164.4 g, 0.52 mol, 1 eq) was added indole-4-boronic acid pinacol ester (376.0 g, 1.55 mol, 3 eq), PdCl$_2$(PPh$_3$)$_2$ (72.0 g, 0.10 mol, 2 eq) and sodium carbonate (110.2 g, 1.04 mol, 2 eq) in dioxane (16.4 L)/water (5.8 L). Reaction mixture was refluxed for 1 h. It was then cooled to 60-70° C. Water (9.8 L), brine (4.9 L) and EtOAc (9.5 L) were added. The phases were separated and the aqueous phase extracted with EtOAc (3×9.5 L) at 60-65° C. The combined organics were dried over MgSO$_4$, filtered and stripped. The resulting solid was slurried in CH$_2$Cl$_2$ (4.75 L) for 30 mins, filtered, washed with CH$_2$Cl$_2$ (3×238 mL) and pulled dry. Further drying in a vacuum oven at 40° C. yielded Intermediate X as a yellow solid (135.7 g, 66%).

<sup>1</sup>H NMR (300 MHz, CDCl$_3$) δ$_H$: 11.27 (br. s, 1H), 10.26 (S, 1H), 9.16 (d, J=2.3 Hz, 1H), 9.11 (d, J=2.3 Hz, 1H), 8.18 (d, J=7.5 Hz, 1H), 7.58-7.67 (m, 2H), 7.49 (t, J=2.8 Hz, 1H), 7.23 (t, 3=7.7 Hz, 1H), 4.08-4.16 (m, 4H), 3.83-3.90 (m, 4H).

MS (ES$^+$) 432.0 (100%, [M+MeOH+H]$^+$).

4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.0$^{2,7}$]trideca-1(13),2(7),3,5,9,11-hexaene (A)

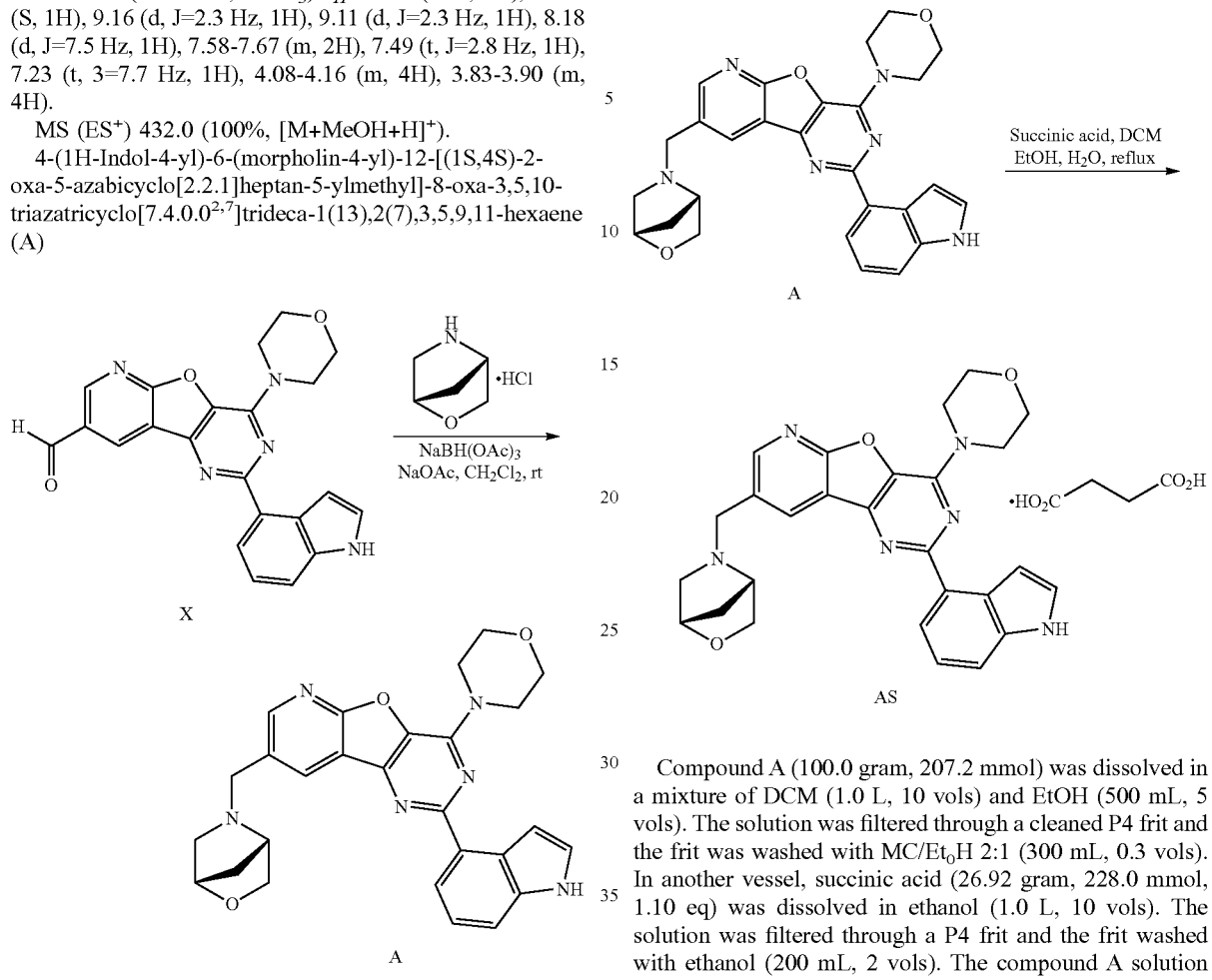

To a suspension of intermediate X (7.00 g, 17.53 mmol, 1 eq), (1S,4S)-2-oxa-5-azabicyclo[2.2.1]heptane hydrochloride (7.13 g, 52.58 mmol, 3 eq) and NaOAc (4.31 g, 52.58 mmol, 3 eq) in anhydrous CH$_2$Cl$_2$ (150 mL) was added NaBH(OAc)$_3$ (7.43 g, 35.06 mmol, 2 eq). The reaction mixture was stirred at rt overnight. Then, it was partitioned with 1N NaOH (100 mL) and extracted with CH$_2$Cl$_2$ (3×200 mL). The combined organic extracts were washed with brine (50 mL) then dried over MgSO$_4$ and the solvent was removed in vacuo. Purification by silica gel column chromatography with EtOAc/MeOH (1:0-7:1) yielded the product A (the compound of the present invention) as a white solid (6.02 g, 71%).

<sup>1</sup>H NMR (300 MHz, CDCl$_3$) δ$_H$: 8.65 (d, J=2.1 Hz, 1H), 8.58 (d, J=2.1 Hz, 1H), 8.37 (br. s., 1H), 8.24 (dd, 3=7.5, 0.9 Hz, 1H), 7.62 (td, 3=2.6, 0.8 Hz, 1H), 7.53 (d, 3=8.1 Hz, 1H), 7.37-7.41 (m, 1H), 7.31-7.37 (m, 1H), 4.47 (s, 1H), 4.22-4.30 (m, 4H), 4.18 (d, J=8.1 Hz, 1H), 3.98 (d, J=2.3 Hz, 2H), 3.91-3.97 (m, 4H), 3.70 (dd, 3=7.9, 1.7 Hz, 1H), 3.53 (s, 1H), 2.94 (dd, 3=10.0, 1.5 Hz, 1H), 2.64 (d, 3-10.2 Hz, 1H), 1.97 (dd, 3=9.8, 1.9 Hz, 1H), 1.80 (dt, J=9.8, 1.1 Hz, 1H).

MS (ES$^+$) 483.1 (100%, [M+H]$^+$).

4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.0$^{2,7}$]trideca-1(13),2(7),3,5,9,11-hexaene; succinic acid (AS)

Compound A (100.0 gram, 207.2 mmol) was dissolved in a mixture of DCM (1.0 L, 10 vols) and EtOH (500 mL, 5 vols). The solution was filtered through a cleaned P4 frit and the frit was washed with MC/Et$_0$H 2:1 (300 mL, 0.3 vols). In another vessel, succinic acid (26.92 gram, 228.0 mmol, 1.10 eq) was dissolved in ethanol (1.0 L, 10 vols). The solution was filtered through a P4 frit and the frit washed with ethanol (200 mL, 2 vols). The compound A solution was charged to a cleaned reactor and concentrated at atmospheric pressure to 13 vols (Tend=41° C.).

1. EtOH (5 vols) was added and distilled atmospherically (Tend=49° C.). Precipitation started during concentration.

2. EtOH (5 vols) was added and distilled atmospherically (Tend=73° C.).

3. Additional solvent was removed (Tend=75° C.).

4. Milli-Q water (100 mL, 1 vol) was added and distillation continued until T=76° C.

The filtered solution of succinic acid was dosed to the compound A suspension in ethanol at reflux, followed by milli-Q water (50 mL, 0.5 vols), later additional milli-Q water was added (1 vol). The suspension was heated at reflux for 5 hours while slowly distilling of solvent. The suspension was then allowed to cool to rT and stirred for ±10 hours. The product was filtered off and washed with EtOH (4 times 1 vols). The filter cake was dried on the filter and for 21 hours at 50° C. in the vacuum oven to give product AS (the succinate salt of the compound of the present invention) as a white to pale yellow solid. Yield: 119.05 gram=198.2 mmol=95.7%.

<sup>1</sup>H NMR (400 MHz, DMF-d7) δ$_H$: 11.32 (br. s, 1H), 8.67 (5, 2H), 8.29 (d, J=7.4 Hz, 1H), 7.70 (m, 1H), 7.64 (d, J=7.4 Hz, 1H), 7.58 (m, 1H), 7.28 (t, J=7.4 Hz, 1H), 4.39 (m, 1H), 4.22 (m, 4H), 4.04 (m, 3H), 3.94 (m, 4H), 3.61 (m, 2H), 2.87 (m, 1H), 2.57 (m, 5H), 1.69 (m, 1H), 1.51 (m, 1H).

MS (ES$^+$) 483.2 (100%, [M+H]$^+$).

The invention claimed is:
1. A method of treating B cell lymphoma in a patient comprising administering to the patient a therapeutically effective amount of a compound having the structure:

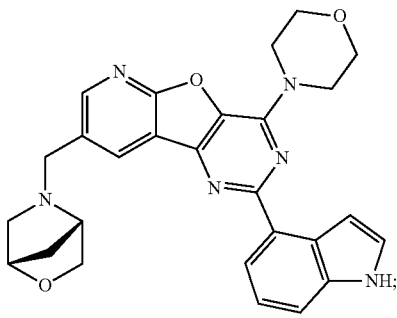 [SMILES: c1cc(-c2nc(N3CCOCC3)c3oc4ncc(CN5C[C@@H]6C[C@H]5CO6)cc4c3n2)c2cc[nH]c2c1]

wherein the B cell lymphoma is treated in the patient.

2. The method of claim 1, for treating or preventing diffuse large B-cell lymphoma, follicular non-Hodgkin lymphoma, chronic lymphocytic leukaemia, small lymphocytic lymphoma, mantle cell lymphoma, marginal zone lymphoma, Burkitt lymphoma, lymphoplasmacytic lymphoma, hairy cell leukaemia, primary central nervous system lymphoma, primary intraocular lymphoma or Waldenstrom macroglobulinemia.

3. The method of claim 1, for treating or preventing B-cell lymphoma, follicular lymphoma, mantle cell lymphoma, chronic lymphocytic leukaemia, small lymphocytic lymphoma or Waldenstrom macroglobulinemia.

4. The method of claim 1, wherein the compound is administered in a total dose of between 50 and 400 mg daily.

5. The method of claim 1, wherein the compound is administered once daily or twice daily.

6. The method of claim 1, wherein the compound is administered to a patient who has already received conventional first-line treatment, comprising one or more of conventional cytotoxic agents selected from the group consisting of, a CD20 antibody with or without a drug conjugate, a BCL2 inhibitor, a BTK inhibitor, an immunomodulatory imide drug, a proteasome, radiation therapy, agents that modulate anti-tumour immunity including agents modulating immune checkpoints, bi-specific T-cell engaging therapies, and cellular therapies; and combinations thereof.

7. A method of treating B cell lymphoma in a patient in need thereof, comprising: administering an effective amount of 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene or a pharmaceutically acceptable salt thereof, wherein the B cell lymphoma is treated in the patient.

8. A method of treating advanced or metastatic B cell lymphoma in a patient in need thereof, wherein the patient has progression of the B cell lymphoma after previous administration of another therapy, comprising: administering an effective amount of 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene or a pharmaceutically acceptable salt thereof, wherein the advanced or metastatic B cell lymphoma is treated in the patient.

9. The method of claim 8, wherein the previous administration of another therapy is a therapy for advanced or metastatic B cell lymphoma.

10. The method of claim 8, wherein the previous administration of another therapy is an administration of another chemotherapeutic agent.

11. The method of claim 10, wherein the previous administration of a chemotherapeutic agent includes conventional cytotoxic agents, a CD20 antibody with or without a drug conjugate, a BCL2 inhibitor, a BTK inhibitor, an immunomodulatory imide drug, a proteasome inhibitor, radiation therapy, agents that modulate anti-tumour immunity including agents modulating immune checkpoints, bi-specific T-cell engaging therapies, or cellular therapies.

12. The method of claim 7, wherein administering an effective amount of 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene or a pharmaceutically acceptable salt thereof, comprises orally administering a total daily dose of about 200 mg to about 400 mg of the 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene.

13. The method of claim 7, wherein administering an effective amount of 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene or a pharmaceutically acceptable salt thereof, comprises orally administering, once or twice daily, about 200 mg to about 400 mg of the 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene.

14. The method of claim 7, wherein the patient has a histological or cytological diagnosis of B cell lymphoma.

15. The method of claim 7, wherein administering an effective amount of 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene or a pharmaceutically acceptable salt thereof, comprises a 28 to 35 day cycle, wherein 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene is administered daily or twice a to the patient for 3 or 4 weeks, and 1 week no 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene is administered.

16. The method of claim 1, further comprising administering to the patient a therapeutically effective amount of at least one second agent selected from the group consisting of conventional cytotoxic agents, a CD20 antibody with or without a drug conjugate, obinutuzumab or ibritumomab, a BCL2, a BTK inhibitor, a MEK inhibitor, an immunomodulatory imide drug such as, a proteasome, radiation therapy, agents that modulate anti-tumour immunity including agents modulating immune checkpoints, bi-specific T-cell engaging therapies, or cellular therapies.

17. The method of claim 16, wherein the administration of the compound and the at least one second agent is separate, sequential or simultaneous.

18. The method of claim 1, wherein the compound is provided as its succinate salt.

19. The method of claim 4, wherein the compound is administered in a total dose of between 200 and 400 mg daily.

20. The method of claim 19, wherein the compound is administered in a total dose of 200 mg daily.

21. The method of claim 12, wherein administering an effective amount of 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene or a pharmaceutically acceptable salt thereof, comprises orally administering a total daily dose of 200 mg of the 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene.

22. The method of claim 13, wherein administering an effective amount of 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene or a pharmaceutically acceptable salt thereof, comprises orally administering, once or twice daily, 200 mg of the 4-(1H-Indol-4-yl)-6-(morpholin-4-yl)-12-[(1S,4S)-2-oxa-5-azabicyclo[2.2.1]heptan-5-ylmethyl]-8-oxa-3,5,10-triazatricyclo[7.4.0.02,7]trideca-1(13),2(7),3,5,9,11-hexaene.

\* \* \* \* \*